United States Patent Office 3,560,550
Patented Feb. 2, 1971

3,560,550
PROCESS FOR THE PREPARATION OF
CYANO-COMPOUNDS
Azel A. Griswold and Paul S. Starcher, Charleston, W. Va., assignors to Union Carbide Corporation, a corporation of New York
No Drawing. Filed June 26, 1968, Ser. No. 740,086
Int. Cl. C07c *121/02*
U.S. Cl. 260—465.2      4 Claims

ABSTRACT OF THE DISCLOSURE

A vapor phase process was developed which comprises contacting a lactone containing from 4 to 12 carbon atoms in its ring structure, preferably ε-caprolactone, with ammonia in the presence of a modified alumina and at a temperature of from about 25° C. to 350° C. to produce an ω-hydroxynitrile and/or a bis-(ω-cyanoalkyl) ether. A liquid phase process was developed which comprises contacting an ω-hydroxynitrile or a bis-(ω-cyanoalkyl) ether with hydrogen in the presence of a hydrogenation catalyst, at a temperature of from about 20° C. to about 120° C. and at a pressure of from about 500 p.s.i.g. to about 2000 p.s.i.g. to hydrogenate the cyano groups to amine groups. In a further liquid phase step, the ω-hydroxyamine so produced can be further contacted with hydrogen and ammonia in the presence of a hydrogenation catalyst, at a temperature of from about 200° C. to about 300° C. and at a pressure of from about 2000 p.s.i.g. to about 7000 p.s.i.g. to produce the α,ω-alkylene diamine. This last-mentioned liquid phase step can be performed directly on the ω-hydroxynitrile or a mixture of the ω-hydroxynitrile and the bis-(ω-cyanoalkyl) ether to produce the α,ω-alkylenediamine.

---

This invention relates to a vapor phase process for producing cyano-compounds and to the production of their amino-derivatives.

In a broad aspect, the basic process comprises contacting a lactone containing from 4 to 12 carbon atoms in its structure, preferably ε-caprolactone, with ammonia in the presence of a modified alumina and at a temperature of from about 250° C. to 350° C. to produce an ω-hydroxynitrile and/or a bis-(ω-cyanoalkyl) ether.

The essential of the basic process may be represented by the following (unbalanced) equation:

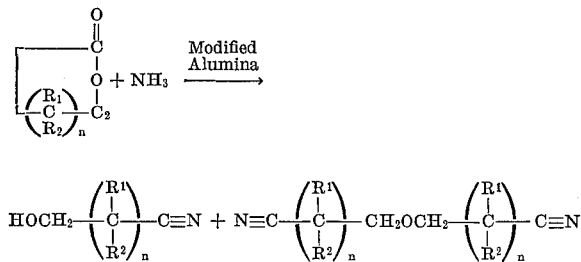

wherein the variables are as defined hereinafter.

For example, when the preferred lactone—ε-caprolactone—is used as a reactant, the product are 6-hydroxycapronitrile and/or bis-(5-cyanopentyl) ether.

The lactone reactant for the baisc process may be represented by the general formula:

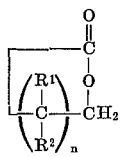

wherein each $R^1$ or $R^2$ is hydrogen, a phenyl radical or a lower alkyl radical containing up to 4 carbon atoms, with the proviso that the sum of the number of carbon atoms in all $R^1$ and $R^2$ groups does not exceed about 8; and $n$ is an integer of 2 to 10, preferably 2 to 4.

Illustrative of the lactone reactants are the following:

γ-butyrolactone
α-methyl-γ-butyrolactone
α,α-dimethyl-γ-butyrolactone
γ-phenyl-γ-butyrolactone
δ-valerolactone
α-ethyl-δ-valerolactone
δethyl-δ-valerolactone
α,δ-diethyl-δ-valerolactone
α,β,δ-triethyl-δ-valerolactone
δ-phenyl-δ-valerolactone
ε-caprolactone
α,β,γ,ε-tetramethyl-ε-caprolactone
ε-propyl-ε-caprolactone
α,ε-dipropyl-ε-caprolactone
ε-butyl-ε-caprolactone
β-phenyl-ε-caprolactone
γ-phenyl-ε-caprolactone
ε-phenyl-ε-caprolactone
ω-hydroxy heptanoic acid lactone
ω-methyl-ω-hydroxy heptanoic acid lactone
β,ε-dimethyl-ω-hydroxy heptanoic acid lactone
ω-phenyl-ω-hydroxy heptanoic acid lactone
ω-butyl-ω-hydroxy heptanoic lactone
ω-hydroxy octanoic acid lactone
ω-methyl-ω-hydroxy octanoic acid lactone
ω-butyl-ω-hydroxy octanoic acid lactone
ω-phenyl-ω-hydroxy octanoic acid lactone
β,ε-dimethyl-ω-hydroxy octanoic acid lactone
ω-hydroxy nonanoic acid lactone
ω-methyl-ω-hydroxy nonanoic acid lactone
β,ε-dimethyl-ω-hydroxy nonanoic acid lactone
ω-butyl-ω-hydroxy nonanoic acid lactone
ω-phenyl-ω-hydroxy nonanoic acid lactone
ω-hydroxy decanoic acid lactone
ω-methyl-ω-hydroxy decanoic acid lactone
β,ε-dimethyl-ω-hydroxy decanoic acid lactone
ω-butyl-ω-hydroxy decanoic acid lactone
ω-phenyl-ω-hydroxy decanoic acid lactone
ω-hydroxy undecanoic acid lactone
ω-methyl-ω-hydroxy undecanoic acid lactone
ω-butyl-ω-hydroxy undecanoic acid lactone
ω-phenyl-ω-hydroxy undecanoic acid lactone
ω-hydroxy dodecanoic acid lactone
ω-methyl-ω-hydroxy dodecanoic acid lactone
ω-butyl-ω-hydroxy dodecanoic acid lactone
ω-phenyl-ω-hydroxy-dodecanoic acid lactone The only criterion to be observed with respect to the other reactant is that it be essentially anhydrous. The source of the ammonia is not generally critical, and it may be admixed with other gases or vapors which do not adversely affect the desired course of the reaction. It may be introduced to the reaction zone at slightly below, at or greater than atmospheric pressure. Indeed, in some instances, it may be advantageouse to introduce the ammonia and even to conduct the process at superatmospheric pressure.

The key to our basic process is the use as a catalyst of an alumina whose activity has been modified, or reduced. Through modification, the number of active sites of the alumina is reduced. Generally, modification results in a product which has a surface area in the range of from about 100 to about 300 square meters per gram.

The method of modification is not critical as long as it does not render the alumina unfit for use in the basic process. For example, the highly active alumina can be modified by contact with a basic compound, e.g., an alkali metal hydroxide, carbonate or bicarbonate, or a mixture thereof. Illustrative of the basic compounds which may be used are lithium, sodium or potassium hydroxide; lithium, sodium or potassium carbonate; and lithium, sodium or potassium bicarbonate. The means for contacting the alumina with the basic compound are generally not critical. A simple means is to spray a dilute solution of the basic compound on the alumina. Other means such as dipping the aluminum in a dilute solution of the basic compound may also be employed. When the means for contacting the alumina with the basic compound comprises the use of an aqueous solution of the basic compound, the excess water should be driven off before the modified alumina is used in the basic process because the basic process is conducted under substantially anhydrous conditions. The amount of basic compound adsorbed on the alumina is suitably from about 0.05 to about 0.5 millimole, preferably about 0.1 to about 0.3 millimole of basic compound per gram of alumina.

Heat is another means for modifying the activity of alumina. The temperature to which the alumina must be heated and the length of time required to modify the alumina to the desired degree will depend to a large extent upon the form of alumina to be modified, especially its degree of hydration. For example, when the alpha-monohydrate is to be modified by heating in air, temperatures within the range of from about 700° C. to about 1150° C. are suitable. When the alpha-trihydrate is to be modified by heating in air, temperatures wtihin the range of from about 500° C. to about 900° C. may be employed. When alpha-trihydrate is heated in steam, temperatures of from about 300° C. to about 700° C. may be employed. Water vapors lowers surface areas at high temperatures. Heating under vacuum also results in a decrease of surface area of the active alumina.

The physical form of the alumina is generally not critical. Granular or pellet forms are suitable, but pellets are generally preferred for ease in handling.

As mentioned above, the surface area of the modified alumina generally is from about 100 to about 300 square meters per gram. The surface area of the modified alumina can be measured by any convenient method known to those skilled in the art. For example, one method that is suitable is that utilizing the Perkin-Elmer Shell Sorptometer. A procedure for the measurement of surfacearea is that by Paul H. Emmet described in "Measurement of Surface of Solid Catalysts" in Catalysis, vol. 1, page 31.

Temperature is a critical variable in the basic reaction. Of course, the temperature must be high enough to maintain a vapor phase reaction. Above 350° C. ω-unsaturated nitriles are produced, however. For example, when ε-caprolactone is used as the reactant, 5-hexenenitrile is produced. Below about 250° C. the lactone reactant and/ or the intermediate products produced en route to the desired cyano-compounds may not be completely vaporized and may in certain instances cause interfering solid deposits to form on reactor surfaces. Therefore, a temperature above about 250° C. is generally employed. The preferred temperature range is from about 250° C. to about 330° C.

For convenience, the basic process is generally carried out at atmospheric pressure. However, subatmospheric and superatmospheric pressures may also be used. For example, pressures as high as 500 p.s.i. and higher may be employed.

The relative concentration of the reactants is not critical. The ammonia is used in excess of the stoichiometric requirement. Generally large excesses are used, e.g., from about 5 moles to about 20 moles of ammonia per mole of lactone may be employed. Greater concentrations of ammonia may also be employed, but no advantage is derived from so doing. It is possible to control the reaction so that either the ω-hydroxynitrile or bis(ω-cyano-alkyl)ether may be produced preferentially. The amount of the former may be increased by increasing the ratio of lactone charged per mole of ammonia, for example.

An optional component in the reactor is a carrier gas which is inert in the reaction, such as hydrogen, nitrogen, carbon dioxide, and the like.

The remaining operating details of the process will be obvious to one skilled in the art. For convenience, a vertical, constant temperature jacketed, tubular reactor packed with the modified alumina in the preferred reactor. The lactone and ammonia, and carrier gas if used, may be concurrently introduced at the top of the reactor.

Illustrative of the products produced by the basic process are:

4-hydroxybutyronitrile
5-hydroxyvaleronitrile
6-hydroxycapronitrile
ω-hydroxyoenanthronitrile
ω-hydroxycaprylonitrile
ω-hydroxypelargononitrile
ω-hydroxycaprinonitrile
5-hydroxy-5-methylvaleronitrile
5-hydroxy-3-phenylvaleronitrile
6-hydroxy-2,6-dimethylcapronitrile
ω-hydroxylauronitrile
bis (3-cyanopropyl) ether
bis(4-cyanobutyl) ether
bis(5-cyanopentyl) ether
bis(6-cyanohexyl) ether
bis(7-cyanoheptyl) ether
bis(8-cyanooctyl) ether
bis(9-cyanonyl) ether
bis(11-cyanoundecyl) ether
bis(4-methyl-4-cyanobutyl) ether
bis(3-phenyl-4-cyanobutyl) ether
bis(1,5-dimethyl-5-cyanopentyl) ether It appears from our work that ω-hydroxamide is an intermediate in the basic reaction. Therefore, this intermediate may be employed as a reactant in place of its corresponding lactone.

The cyano-compounds produced in the vapor phase basic process—i.e., the ω-hydroxnitriles and the bis-(ω-cyanoalkyl) ethers—can be further reacted in a liquid phase process step which comprises contacting the cyano-compounds with hydrogen in the presence of a hydrogenation catalyst, at a temperature of afrom about 20° C. to about 120° C. and at a pressure of from about 500 p.s.i.g. to about 2000 p.s.i.g. to hydrogenate the cyano groups to amino groups.

This liquid phase process step may be represented by the following (unbalanced) equations:

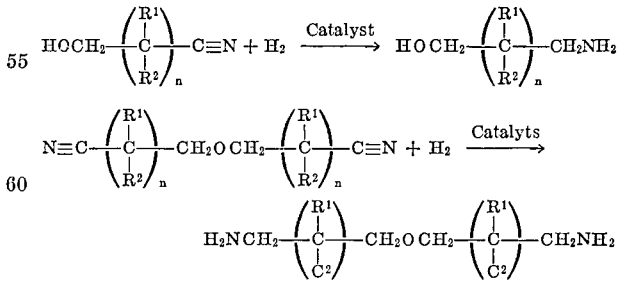

where the variables are as described above with reference to the basic process.

The ω-hydroxynitrile which may be used as a reactant in this process step may be represented by the following formula:

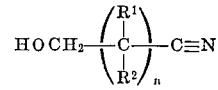

wherein the variables are as described above. The preferred reactants are those wherein $n$ has a value of from 2 to 4. Illustrative of ω-hydroxynitriles which may be used are those listed above as products of the basic process of this invention. That process offers a convenient route for the preparation of the ω-hydroxynitriles, but other routes to these reactants may also be utilized.

The bis-(ω-cyanoalky) ether which may be used as a reactant in this process step may be represented by the following formula:

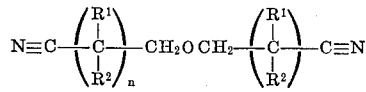

wherein the variables are as described above. The preferred reactants are those wherein $n$ has a value of from 2 to 4. Illustrative of such bis-(ω-cyanoalkyl) ethers which may be used are those listed above as products of the basic process of this invention. That process offers a convenient route for the preparation of the bis-(ω-cyanoalkyl) ethers, but other routes to these reactants may also be utilized.

The source of the hydrogen is not critical, and it may be supplied to the reaction zone either alone or in admixture with other gases which do not adversely affect the course of the reaction. The hydrogen may be supplied at slightly below at or above atmospheric pressure. Supplying the hydrogen at a pressure above atmospheric is preferred because the reaction is carried out at such a pressure.

The ratio of reactants is not critical. Generally, from the stoichiometric requirement to a large excess of hydrogen is employed. Suitable amounts are in the range of from about 2 to about 20 moles of hydrogen per mole of ω-hydroxynitrile and from about 4 to about 20 moles of hydrogen per mole of bis-(ω-cyanoalkyl) ether.

The catalyst used is a hydrogenation catalyst of the type generally used in other hydrogenation reactions. Such catalysts generally are comprised of the metals of Group VIII of the Periodic Table of the Elements, and include the catalytically active forms of nickel, including Raney nickel, palladium, platinum, rhodium, cobalt and iridium. At least a catalytic amount of the catalyst is employed. The catalyst may be on a support such as carbon, if desired.

Generally, relatively low temperatures, on the order of from about 20° C. to about 120° C., are employed in the process step.

The reaction is conducted at a pressure of from about 500 p.s.i.g. to about 2000 p.s.i.g.

The type of equipment suitable for use in this process step will be readily apparent to one skilled in the art of hydrogenation. Generally, the equipment must be such as to provide intimate contact of the ω-hydroxynitrile or bis-(ω-cyanoalkyl) ether and hydrogen with the catalyst employed. In the laboratory this most readily accomplished by use of a bomb, which, after all three components of the process are charged, is then pressurized and agitated.

Illustrative products of this process step are:

4-aminobutanol
2-methyl-4-aminobutanol
2,3-dimethyl-4-aminobutanol
3-phenyl-4-aminobutanol
5-aminopentanol
3-methyl-5-aminopentanol
3-phenyl-5-aminopentanol
6-aminohexanol
3-methyl-6-aminohexanol
4-phenyl-6-aminohexanol
7-aminoheptanol
3-methyl-7-aminoheptanol
4-phenyl-7-aminoheptanol
8-aminooctanol
5-phenyl-8-aminooctanol
9-aminononanol
5-ethyl-9-aminononanol
10-aminodecanol
6-phenyl-10-aminodecanol
11-aminoundecanol
6-ethyl-11-aminoundecanol
12-aminododecanol
6-phenyl-12-aminododecanol
bis-(4-aminobutyl) ether
bis-(2-methyl-4-aminobutyl) ether
bis-(5-aminopentyl) ether
bis-(3-ethyl-5-aminopentyl) ether
bis-(6-aminohexyl) ether
bis-(3-phenyl-6-aminohexyl) ether
bis-(7-aminoheptyl) ether
bis-(4-phenyl-7-aminoheptyl) ether
bis-(8-aminooctyl) ether
bis-(4-ethyl-8-aminooctyl) ether
bis-(9-aminononyl) ether
bis-(5-butyl-9-aminononyl) ether
bis-(10-aminodecyl) ether
bis-(5-propyl-10-aminodecyl) ether
bis-(12-aminododecyl) ether
bis-(6-phenyl-12-aminododecyl) ether In a further liquid phase process step, the aminoalcohols produced in the above-described liquid phase process step can be further contacted with hydrogen and ammonia in the presence of a hydrogenation catalyst, at a temperature of from about 200° C. to about 300° C. and at a pressure of from about 2000 p.s.i.g. to about 7000 p.s.i.g. to produce the α,ω-alkylene diamines.

The process step may be represented by the following (unbalanced) equation:

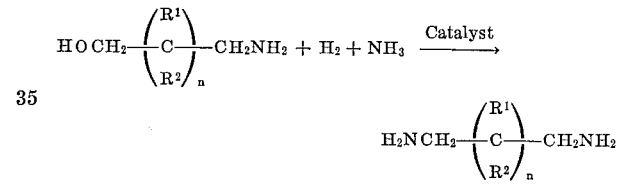

wherein the variables are as described above. Preferably, $n$ has a value of from 2 to 4. Illustrative of the aminoalcohol reactants are those produced by the liquid phase process described above.

The comments above on hydrogen, ammonia and the hydrogenation catalysts are applicable to this process step.

Illustrative of the products of this process step are:

1,4-butylene diamine
1,5-pentylene diamine
1,6-hexylene diamine
1,7-heptylene diamine
1,8-octylene diamine
1,9-nonylene diamine
1,10-decylene diamine
1,12-dodecylene diamine This last-mentioned liquid phase step (reductive amination) can be performed directly on the ω-hydroxynitrile to produce the α,ω-alkylene diamine. With the exception of the substitution of the ω-hydroxynitrile for the aminoalcohol, the other reaction conditions remain the same. An intermediate initially produced in this reaction step is the aminoalcohol, which then is reductively aminated to the α,ω-alkylene diamine. The reductive amination is an equilibrium reaction between the intermediate aminoalcohol and the diamine and the imine products. If the reaction is to be operated on a continuous basis, the imine should be recycled to the reactor in order to favor production of the diamine.

Under the ordinary hydrogenation conditions described above—that is, low temperature and low pressure—cracking of the bis-(ω-cyanoalkyl) ether occurs to a small extent. However, under the more drastic conditions of reductive amination, cracking of the ether occurs to a much greater, or even total, extent depending upon the conditions employed. Therefore, the product mixture from the vapor phase basic process comprised of the ω-hydroxynitrile and bis-(ω-cyanoalkyl) ether may be directly subjected to reductive amination when the product desired is the alkylene diamine. This, of course, results in improved over-all efficiencies in the conversion of lactone to alkylenediamine.

All the products produced by either the basic vapor phase process or the liquid phase process steps of this invention are readily separated by conventional means known to one skilled in the art. The most convenient method of separation is distillation.

The cyano-compounds of this invention are useful as intermediates for the production of ω-aminoalcohols, α,ω-alkylene diamines and bis-(ω-aminoalkyl) ethers by the steps detailed above. The cyano groups of the cyano-compounds may also be hydrolyzed to carboxylic acid groups. For example, the bis-(ω-cyanoalkyl) ethers may be hydrolyzed to the corresponding dicarboxylic acid derivatives, which may be used in the preparation of polyesters or polyamides. Those compounds of this invention which contain hydroxy groups and/or amine groups are useful as epoxy curing agents.

In the liquid phase hydrogenation steps, an inert solvent may be used. Suitable solvents are the alkanols, e.g., methanol, ethanol and the like; butyl Carbitol®; tetrahydrofuran; dioxane; and the like. In the liquid phase reductive amination step, an inert solvent may also be used. Suitable solvents are tetrahydrofuran, dioxane, and the like.

The following examples are illustrative of the various aspects of our invention.

EXAMPLES 1–3

Apparatus and procedure

A Dowtherm-jacketed, tubular reactor (1" I.D.) was used in all of the vapor-phase reactions. The modified alumina bed (200 ml. of ⅛" pellets) was approximately 17" long and was centered in the constant temperature portion of the Dowtherm jacket. A Pyrex head was mounted at the top and contained inlets for gas feed, liquid feed and an opening for a thermowell. A stainless steel thermowell (¼"), extending to the bottom of the catalyst bed, was used to monitor the temperature inside the reactor tube. The thermowell had several holes, approximately 16" from the bottom of the catalyst bed, drilled through it and when temperature monitoring was no longer necessary the thermocouples were removed and the well was then used as the ammonia feed tube. This allowed the ammonia to be fed just below the surface of the catalyst and minimized its contact with the lactone. Hydrogen was used as a carrier gas. The lactone was fed through an inlet in the Pyrex head, such that it dripped down onto the flash-packing. A layer of glass beads on top of the catalyst bed was used as the flash-area. Hydrogen and ammonia were metered into the system by means of calibrated Manostat flowmeters. ε-Caprolactone was pumped into the reactor with a Zenith pump. An air-cooled collector was attached to the outlet of the reactor and a 3' air-cooled condenser led from the collector to an ice/water cooled trap. The crude product mixture was separated by distillation. The products were identified by infrared, nuclear magnetic resonance and carbon, hydrogen and nitrogen analyses.

Modification of Alcoa F-110 alumina

A solution containing 1.50 g. of anhydrous sodium carbonate and 30 ml. of water was sprayed onto 216.8 g. (250 ml.) of Alcoa F-110 alumina. The sprayer was a Pyrex, compressed-air-operated apparatus, usually used in thin-layer chromatographic applications. The alumina spheroids (⅛") were constantly turned during spraying, in order to achieve even application of the solution. The theoretical amount of sodium added was 0.3 to 0.5 percent by weight, as indicated in Table I. Actual sodium and potassium analyses indicated 0.76 percent Na and 0.05 percent K present in that sample to which was theoretically added 0.3 percent of sodium. The wet alumina was placed in the reactor; the reactor was heated to 350° C.; and nitrogen was passed through the alumina overnight in order to dry it.

Details of the examples are given in Table I, which follows:

TABLE I

| Catalyst | Temperature °C. | Molar ratios, NH₃:ε-caprolactone:H₂ | Percents | Percent, ε-caprolactone | Percent, HO(CH₂)₅C≡N | Percent, bis-(5-cyano-pentyl) ether |
|---|---|---|---|---|---|---|
| Example: | | | | | | |
| 1........ Alcoa F-110 [1] | 330 | 6:1:3 | In collected product... | 32.2 | 22.5 | 9.25 |
| | | | Yield............ | | 22.1 | 9.87 |
| | | | Efficiency....... | | 32.2 | 14.41 |
| | | | Conversion...... | 68.5 | | |
| 2........ Same catalyst as in Example 1.[2] | 330 | 6:1:3 | In collected product... | 5.72 | 32.33 | 16.17 |
| | | | Yield............ | | 31.7 | 17.3 |
| | | | Efficiency....... | | 33.5 | 18.3 |
| | | | Conversion...... | 94.5 | | |
| 3........ Alcoa F-110 [3] | 350 | 10:1:15 | In collected product... | 0.4 | 18.7 | 6.8 |
| | | | Yield............ | | 17.0 | 6.7 |
| | | | Efficiency....... | | 17.1 | 6.7 |
| | | | Productivity [4]. | | 21.2 | 7.7 |
| | | | Conversion...... | 99.6 | | |

[1] Alumina with 0.5% added Na (as Na₂CO₃).
[2] Recycle of product from Example 1.
[3] Alumina with 0.3% added Na (as Na₂CO₃).
[4] Productivity in grams/liter of catalyst/hour.

When the above examples are repeated using γ-butyrolactone or δ-valerolactone instead of ε-caprolactone, the products produced from the γ-butyrolactone are 4-hydroxybutyronitrile and bis-(3-cyanopropyl) ether and the products produced δ-valerolactone are 5-hydroxyvaleronitrile and bis-(4-cyanobutyl)ether.

EXAMPLE 4

Preparation of 6-aminohexanol

A solution of 6-hydroxycapronitrile (119 g. which contained 9 percent ε-caprolactam) in methanol (500 ml.) was charged, along with 10 g. of methanol-washed Raney nickel, to a three-liter bomb. Ammonia (83.0 g., 4.9 moles) was charged to the bomb. The bomb was charged with hydrogen to 750 p.s.i.g., at which time rocking and heating was commenced. The temperature was stabilized at 100° C. for three hours and at this point, heating was stopped and the bomb was allowed to cool overnight. The reaction mixture was filtered to remove the Raney nickel, after which the methanol was distilled at atmospheric pressure. The residue (127.0 g.) was distilled under high vacuum, giving one product (B.P. 130.5 to 131.5° C. at 10.2 mm.) which was identified by IR and N.M.R. as being 6-aminohexanol. The amount of pure 6-aminohexanol was 93.0 g., which was an 83.1 percent conversion. The product immediately crystallizes in the distillation receiver. The observed M.P. is 54–5° C.

When 4-hydroxybutyronitrile is used instead of 6-hydroxycapronitrile in the above example, the product is 4-aminobutanol. When 5-hydroxyvaleronitrile is used instead of 6-hydroxycapronitrile in the above example, the product is 5-aminopentanol.

EXAMPLE 5

Preparation of bis-(6-aminohexyl)ether

A solution containing 160 g. (0.77 moles) of bis-(5-cyanopentyl) ether and 250 ml. of anhydrous methanol was charged to a one-liter bomb. Methanol-washed Raney nickel (15 g.) was added to the charge. The bomb was sealed, after which 112 g. of ammonia was forced into the bomb. Hydrogen was added to the bomb so that the gauge pressure read 1000 p.s.i. Heating was commenced until the temperature of the bomb reached 110° C. Periodic hydrogen additions were necessary during the heating period. After four hours at 110° C., the pressure appeared relatively constant. The bomb was allowed to cool overnight. After filtration of the reaction mixture to remove Raney nickel, the methanol was distilled off at atmospheric pressure. The residue was flash distilled, giving 113 g. of distillate. The distillate was fractionated under high vacuum to 6-aminohexanol and bis-(6-aminohexyl) ether (78.8 g., 47.4 percent). The 6-aminohexanol was not pure since it contained approximately 25 percent of an unidentified compound. The N.M.R. and IR spectra were completely consistent for the indicated structure of bis-(6-aminohexyl) ether.

In a similar manner, bis-(4-aminobutyl) ether may be produced from bis - (3 - cyanopropyl) ether, and bis-(5-aminopentyl) ether may be produced from bis-(4-cyanobutyl) ether.

EXAMPLE 6

Liquid-phase reductive amination of 6-hydroxycapronitrile using Raney nickel catalyst A 3 l. rocking autoclave was charged with 6-hydroxycapronitrile (114.0 g., 1 mole), Raney nickel (25.0 g.), tetrahydrofuran (250.0 g.) and anhydrous ammonia (341.0 g., 20.0 moles). Hydrogen was charged to the bomb (1500 p.s.i.g.). The temperature was increased until 245° C. was attained. The reaction was allowed to proceed at this temperature (4600 p.s.i.g.) for 3.25 hours, at which time the heat was turned off. After cooling to room temperature, the residual pressure was drained off through two Dry Ice/acetone traps in order to retain all products. The liner was emptied and washed with fresh tetrahydrofuran. The ammonia was allowed to evaporate slowly, leaving liquid residue which was found by analysis to be slovent and hexamethyleneimine. The material taken from the bomb was distilled in order to remove the solvent. The residue from the cold trap was combined with the distillate. The residue and the combined solvents were analyzed by vapor phase chromatography (v.p.c.). The following data were calculated from the v.p.c. spectrum using previously determined v.p.c. response factors for each compound.

|  | Hexamethyleneimine | Hexamethylenediamine | 6-aminohexanol | 6-hydroxylcapronitrile |
|---|---|---|---|---|
| Moles | 0.339 | 0.149 | 0.346 | 0.0 |
| Percent yield | 33.9 | 14.9 | 34.6 | |
| Percent efficiency | 33.9 | 14.9 | 34.6 | |
| Percent conversion | | | | 100 |

Residue=15.5 grams.

The above figures should undoubtedly be based upon 6-aminohexanol, since 6-hydroxycapronitrile is reduced to the aminoalcohol very quickly. The figures would then look as follows:

|  | Hexamethyleneimine | Hexamethylenediamine | 6-aminohexanol |
|---|---|---|---|
| Moles | 0.339 | 0.149 | 0.346 |
| Percent yield | 33.9 | 14.9 | |
| Percent efficiency | 51.9 | 22.9 | |
| Percent conversion | | | 65.4 |

What we claim is:

1. A vapor-phase process which comprises contacting (A) essentially anhydrous ammonia and (B) a lactone of the formula:

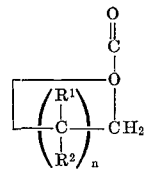

wherein each $R^1$ or $R^2$ is hydrogen, a phenyl radical or a lower alkyl radical containing up to 4 carbon atoms, with the proviso that the sum of the number of carbon atoms in all $R^1$ and $R^2$ groups does not exceed 8, and $n$ is an integer of 2 to 10, in the presence of (C) a modified alumina catalyst consisting essentially of alumina having a surface area of from about 100 to about 300 square meters per gram said modification being either by contact with at least one base selected from the class consisting of alkali metal hydroxides, alkali metal carbonates or alkali metal bicarbonates or by heat-modification at a temperature in the range of about 300° C. to 1150° C., said process being carried out at a temperature of from about 250° C. to 350° C., thereby producing an α,ω-hydroxynitrile and a bis-(ω-cyanoalkyl)ether corresponding to the lactone (B).

2. A process as claimed in claim 1 wherein $n$ has a value of from 2 to 4.

3. A process as claimed in claim 2 wherein the lactone is ε-caprolactone.

4. A process as claimed in claim 1 wherein the temperature is from about 250° C. to 330° C.

References Cited
UNITED STATES PATENTS

| | | | |
|---|---|---|---|
| 2,584,970 | 2/1952 | Alexander et al. | 260—465.6X |
| 3,043,860 | 7/1962 | Phillips et al. | 260—465.2 |
| 3,121,733 | 2/1964 | Von Schickh et al. | 260—465.2 |

JOSEPH P. BRUST, Primary Examiner

U.S. Cl. X.R.

260—465, 465.6, 465.9, 561, 584, 585

PO-1050
(5/69)

UNITED STATES PATENT OFFICE
CERTIFICATE OF CORRECTION

Patent No. 3,560,550   Dated February 2, 1971

Inventor(s) A.A. Griswold and P.S. Starcher

It is certified that error appears in the above-identified patent and that said Letters Patent are hereby corrected as shown below:

The formula at column 1, line 50 and in claim 1 should

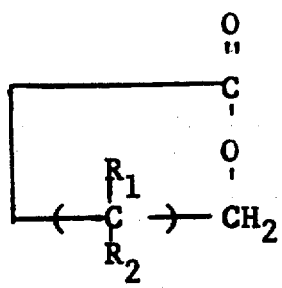

The formula in the equation at column 6 lines 31-38 sho read:

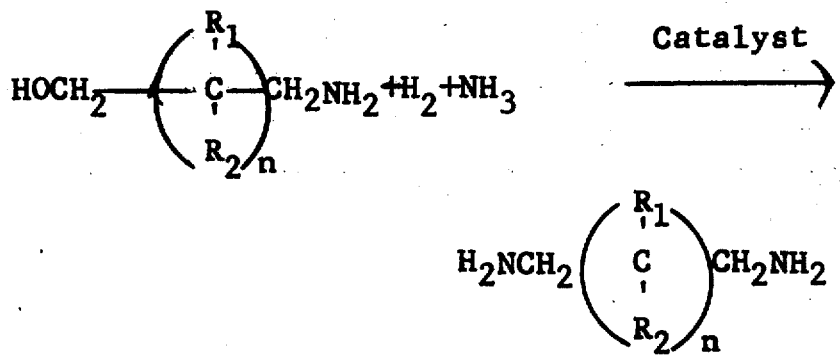

Signed and sealed this 11th day of May 1971.

(SEAL)
Attest:

EDWARD M. FLETCHER, JR.          WILLIAM E. SCHUYLER
Attesting Officer                 Commissioner of Pat